UNITED STATES PATENT OFFICE.

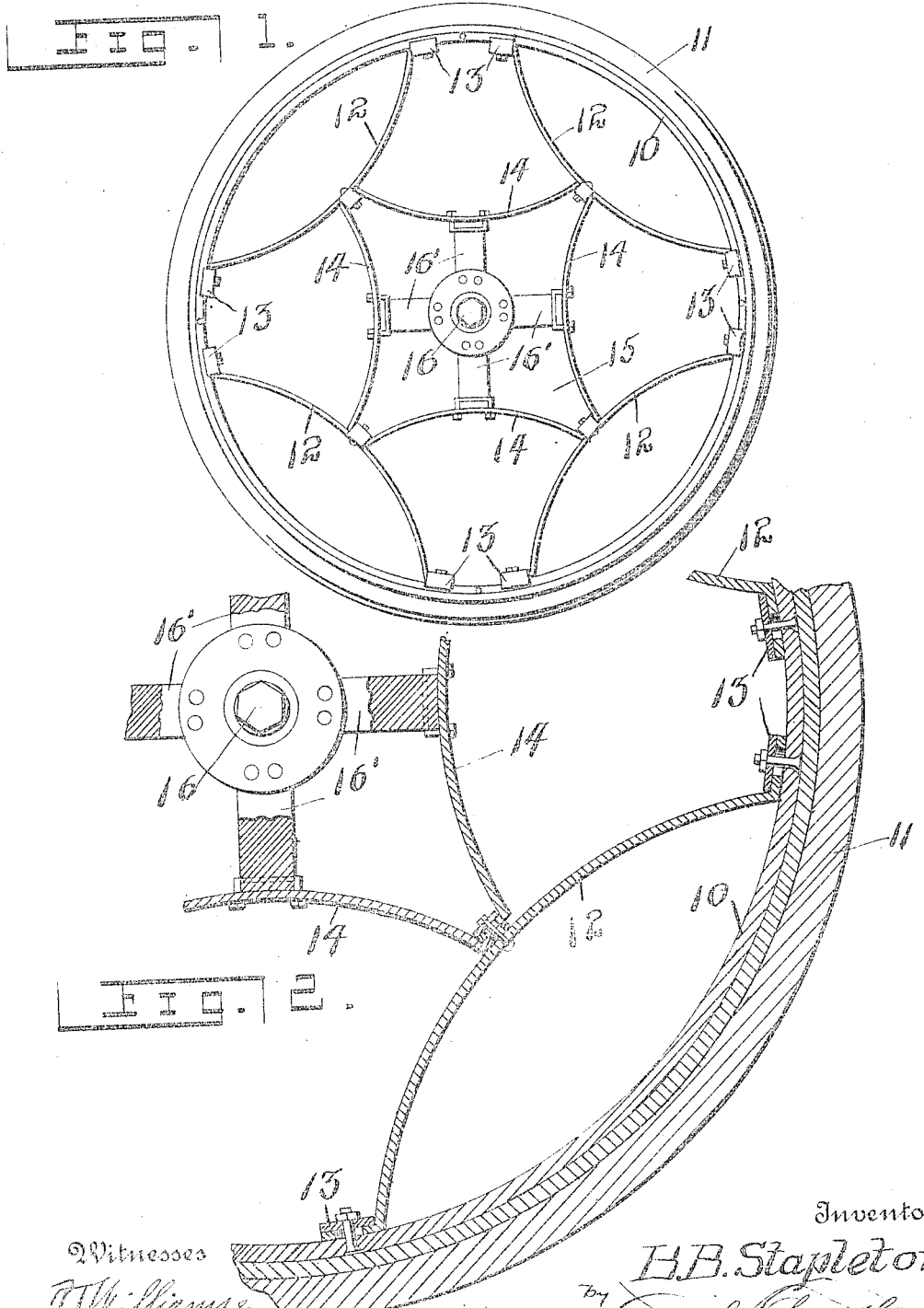

BIRT B. STAPLETON, OF DOWNING, MISSOURI, ASSIGNOR OF ONE-HALF TO E. J. GOINES, OF MEMPHIS, MISSOURI.

AUTOMOBILE-WHEEL.

1,089,445.  Specification of Letters Patent.  Patented Mar. 10, 1914.

Application filed November 25, 1912. Serial No. 733,435.

*To all whom it may concern:*

Be it known that I, BIRT B. STAPLETON, a citizen of the United States, residing at Downing, in the county of Schuyler, State of Missouri, have invented certain new and useful Improvements in Automobile-Wheels; and I do hereby declare the following to be a full, clear, and exact description of the invention, such as will enable others skilled in the art to which it appertains to make and use the same.

This invention relates to improvements in wheels, and has particular reference to a spring wheel.

The principal object is to provide a device of this character, of simple construction, from which the greatest amount of resiliency is obtained, with a minimum number of parts.

Other objects and advantages will be apparent from the following description and with particular reference to the accompanying drawings.

In the drawings: Figure 1 is an elevation of a wheel made in accordance with my invention, and Fig. 2 is an enlarged longitudinal fragmentary view of the wheel.

Referring particularly to the accompanying drawings, 10 represents the metal or other band, forming the rim of the wheel, and on which is adapted to be placed either a metal or a cushion tire 11. Arranged within the rim 10 are the bowed flat metal springs 12, there being four shown in the drawings, the convexed portion of the springs being directed toward the center of the wheel, and the ends secured to the rim 10, as indicated at 13. Similar but smaller bowed flat springs 14, are secured at their ends to the middle portion of the springs 12 and form a four-sided frame 15 within the wheel. Disposed within the center of this frame is the hub 16 which is of ordinary construction, and is connected at its end to the hub and to the middle portions of the springs 14 are the braces 16'.

What is claimed is:

A wheel including a rim having inwardly projecting bolts carried thereby, bowed springs having apertured end portions engaged with the bolts, substantially U-shaped clips straddling the feet of the springs and the rim and receiving the bolts therethrough, bolts carried by the intermediate portions of the springs, similar springs having apertured feet engaged with the last mentioned bolts, substantially U-shaped clips straddling the last mentioned feet and the intermediate portions of the first mentioned springs, a hub, and radiating braces secured to the hub and secured at their outer ends to the intermediate portions of the second named springs.

In testimony whereof, I affix my signature, in the presence of two witnesses.

BIRT B. STAPLETON.

Witnesses:
THOS. C. SMITH,
J. R. HUDSON.